US012559157B2

(12) United States Patent
Ponikiewski

(10) Patent No.: US 12,559,157 B2
(45) Date of Patent: Feb. 24, 2026

(54) STEERING COLUMN ASSEMBLY FOR A VEHICLE

(71) Applicant: ZF Steering Systems Poland Sp. Z o.o., Czechowcie-Dziedzice (PL)

(72) Inventor: Pawel Ponikiewski, Pewel Mała (PL)

(73) Assignee: ZF STEERING SYSTEMS POLAND SP. Z O.O., Czechowcie-Dziedzice (PL)

( * ) Notice: Subject to any disclaimer, the term of this patent is extended or adjusted under 35 U.S.C. 154(b) by 0 days.

(21) Appl. No.: 18/822,549

(22) Filed: Sep. 3, 2024

(65) Prior Publication Data

US 2025/0074497 A1 Mar. 6, 2025

(30) Foreign Application Priority Data

Sep. 5, 2023 (EP) .................................... 23461646
Oct. 24, 2023 (GB) .................................... 2316252

(51) Int. Cl.
*B62D 1/185* (2006.01)
*B62D 1/183* (2006.01)
*B62D 1/184* (2006.01)

(52) U.S. Cl.
CPC ............. *B62D 1/185* (2013.01); *B62D 1/183* (2013.01); *B62D 1/184* (2013.01)

(58) Field of Classification Search
CPC ....................................................... B62D 1/184
See application file for complete search history.

(56) References Cited

U.S. PATENT DOCUMENTS

| | | | |
|---|---|---|---|
| 2002/0089161 A1* | 7/2002 | Yamamura ............. | B62D 1/184 280/775 |
| 2011/0187089 A1* | 8/2011 | Sakata ................... | B62D 1/185 280/775 |
| 2016/0052536 A1* | 2/2016 | Nicolussi ................ | F16C 43/02 384/441 |

(Continued)

FOREIGN PATENT DOCUMENTS

| | | | | | |
|---|---|---|---|---|---|
| BE | 1029836 B1 | * | 5/2024 | ............. | B62D 1/185 |
| CN | 108146491 A | * | 3/2018 | ............... | B62D 1/19 |
| CN | 116767334 A | * | 9/2023 | ............. | B62D 1/181 |

(Continued)

OTHER PUBLICATIONS

Search Report for corresponding Application Serial No. GB2316252.2, dated Mar. 4, 2024, pp. 1-3.

(Continued)

*Primary Examiner* — Nicole T Verley
(74) *Attorney, Agent, or Firm* — Tarolli, Sundheim, Covell & Tummino LLP

(57) ABSTRACT

A steering column assembly (10) for a vehicle has a first end (10a) for connection with a steering wheel and a second end (10b) spaced along an adjustment axis (A-A) from the first end (10a). The assembly (10) comprises a first column tube (20) and a second column tube (40) telescopically received within the first column tube (20) and displaceable with respect to the first column tube (20) along the adjustment axis (A-A). A preload mechanism (60) is located between the first column tube (20) and the second column tube (40). The preload mechanism (60) is configured to be actuated at a predetermined position of the second column tube (40) with respect to the first column tube (20).

28 Claims, 5 Drawing Sheets

(56)     References Cited

U.S. PATENT DOCUMENTS

2017/0158220 A1     6/2017   Appleyard

FOREIGN PATENT DOCUMENTS

| | | | | | | |
|---|---|---|---|---|---|---|
| CN | 117985093 | A | * | 5/2024 | ............ | B62D 1/181 |
| CN | 119142403 | A | * | 12/2024 | | |
| DE | 102016202465 | A1 | | 8/2017 | | |
| DE | 102018211041 | A1 | * | 1/2020 | ............ | B62D 1/181 |
| DE | 102019201390 | A1 | | 8/2020 | | |
| DE | 102022202602 | A1 | * | 9/2023 | ............ | B62D 1/181 |
| EP | 1136341 | A2 | * | 9/2001 | ............ | B62D 1/185 |
| EP | 1547903 | A1 | | 9/2010 | | |
| FR | 2795787 | B1 | * | 5/2003 | | |
| JP | 2004262433 | A | * | 9/2004 | ............ | B62D 1/184 |
| JP | 2005306216 | A | * | 11/2005 | ............ | F16C 21/005 |
| JP | 2005313691 | A | * | 11/2005 | ............ | B62D 1/185 |
| JP | 2007315516 | A | * | 12/2007 | | |
| JP | 2007321789 | A | * | 12/2007 | | |
| JP | 2009107428 | A | * | 5/2009 | | |
| JP | 2009191935 | A | | 8/2009 | | |
| JP | 2009192064 | A | * | 8/2009 | | |
| SE | 530143 | C2 | * | 3/2008 | ............... | B62D 1/16 |
| WO | WO-2020185030 | A1 | * | 9/2020 | ............ | B62D 1/181 |
| WO | WO-2022269932 | A1 | * | 12/2022 | ............ | B62D 1/181 |

OTHER PUBLICATIONS

Search Report for corresponding DE Application Serial No. 10 2024 207 869.7, dated Feb. 26, 2025, pp. 1-12.

* cited by examiner

STEERING COLUMN ASSEMBLY FOR A VEHICLE

RELATED APPLICATIONS

This application claims priority from EP patent application Ser. No. 23461646.4, filed 5 Sep. 2023 and GB Patent Application 2316252.2, filed 24 Oct. 2023, the entireties of which are hereby incorporated herein by reference.

RELATED APPLICATIONS

This application claims priority from EP Patent Application 23461646.4, filed 5 Sep. 2023 and GB Patent Application 2316252.2, filed 24 Oct. 2023, the entireties of which are hereby incorporated herein by reference.

TECHNICAL FIELD

This invention relates generally to steering column assemblies for vehicles and to vehicles comprising such steering column assemblies. More specifically, although not exclusively, this invention relates to adjustable steering column assemblies for use in motor vehicle steering systems.

BACKGROUND

Steering column assemblies for motor vehicles are often provided with both reach and rake adjustability. Reach adjustment is generally the adjustment of a steering wheel, attached to an end of a steering column, relative to a front of the vehicle to optimize driver comfort. In order to facilitate reach adjustment the steering column assembly normally includes two or more telescopic parts and a motor arranged to move the telescopic parts relative to one another along an adjustment axis extending in the fore and aft direction of a vehicle in which it is fitted.

The natural frequency performance of a steering column assembly is a key user requirement due to its impact on comfort. It has been found that in order to provide adequate natural frequency performance, appropriate stiffness must be engineered into the steering column assembly. One characteristic of a steering column assembly that has a particular impact on the stiffness, and therefore natural frequency performance, is the degree of overlap between the telescopic parts. In general, the greater the amount of overlap between the telescopic parts, the better the natural frequency performance of the assembly. However, packaging constraints often means that the available overlap is limited.

Ensuring sufficient natural frequency performance can be challenging. It would be advantageous to provide a steering column assembly in which stiffness is provided in the case of limited overlap between telescopic parts.

SUMMARY

In accordance with the present invention a steering column assembly for a vehicle has a first end for connection with a steering wheel and a second end spaced along an adjustment axis from the first end, and the assembly comprises:

a first column tube;

a second column tube telescopically received within the first column tube displaceable with respect to the first column tube along the adjustment axis; and a preload mechanism located between the first column tube and the second column tube, wherein the preload mechanism is configured to be actuated at a predetermined position of the second column tube with respect to the first column tube.

The preload mechanism may comprise a portion mounted on one of the first and second column tubes that engages with a projection on the other of the first and second column tubes so as to actuate the preload mechanism.

The portion may be mounted on the first column tube and the projection may be located on the second column tube. The projection may be located on an outer surface of the second column tube.

The preload mechanism or portion may comprise a follower. The follower may be mounted on one of the first and second column tubes. The follower may be engageable with the other of the first and second column tubes. The follower may be engageable with a projection on the other of the first and second column tubes. The follower may be mounted on the first column tube and contact an outer surface of the second column tube.

The follower may comprise a roller, a wheel or a slider.

The preload mechanism may comprise a lever pivotally mounted on one of the first and second column tubes. The lever may have two followers on opposite sides of the lever pivot engageable with the other of the first and second column tubes. The projection may engage with one of the followers at a predetermined position of the second column tube with respect to the first column tube.

The lever may be pivotally mounted on the first column tube. The two followers may be engageable with the second column tube, e.g. an outer surface thereof.

The lever may be pivotally mounted on the first column tube and the two followers may contact the second column tube, e.g. an outer surface thereof.

The two followers may comprise a first roller and a second roller spaced from one another along the adjustment axis.

The first and second rollers may be each displaceable relative to the first column tube or the second column tube about the pivot axis of said lever pivot.

The first and second rollers may be mounted to the first column tube or the second column tube via the lever and/or lever pivot.

The first and second rollers may be located on either side of the lever pivot along the adjustment axis.

The lever may be or may comprise a yoke.

The lever pivot may comprise a shaft or pin rotatably mounted to the first column tube or the second column tube. The shaft or pin may be mounted eccentrically to the first column tube or the second column tube.

The pivot axis of the lever pivot may extend generally perpendicular to the adjustment axis.

The first and second rollers may each be spaced from the lever pivot, e.g. in the direction of the adjustment axis. The first and second rollers may each be spaced from the lever pivot by a respective roller lever or moment arm.

The distance between one of the followers and the pivot axis of the lever pivot and the distance between the other of the followers and the pivot axis of the lever pivot may be different.

The distance between a rotational axis of the first roller and the pivot axis of the lever pivot and the distance between a rotational axis of the second roller and the pivot axis of the lever pivot may be different.

A first of the followers may located closer than a second of the followers to the first end and the distance between first follower and the pivot axis of the lever pivot may be less than the distance between the second follower and the pivot axis of the lever pivot.

The first roller may be located closer than the second roller to the first end.

The distance between the rotational axis of the first roller and the pivot axis of the lever pivot may be less than the distance between the rotational axis of the second roller and the pivot axis of the lever pivot.

The followers and lever may together define a fulcrum.

A surface of the first column tube or the second column tube may comprises a longitudinally extending channel or recess. The channel or recess may extend generally parallel to the adjustment axis. The followers may engage or contact the channel or recess, e.g. when the steering column assembly is in a stowed position.

The channel or recess may comprise a flattened portion of the first column tube or the second column tube. The channel or recess may comprise a flattened portion of the outer surface of the second column tube.

The channel or recess may terminate with the projection.

The channel or recess may terminate short of each terminal end of the first column tube or the second column tube. The channel or recess may terminate with a projection at one or each end.

The or each projection may be located at or towards one end of the channel or recess.

The or each projection may be elongate.

The or each projection may be or may comprise a ramp.

The or each projection may form part of the first or second column tube on which the lever is not mounted.

The steering column assembly may comprise a stowed position wherein the or each of the followers is in contact with the channel or recess.

The steering column assembly may comprise an extended or fully extended position and wherein the or one of the followers, e.g. the second follower or the second roller, may be configured to engage the projection when the steering column assembly is moved from the stowed position to the fully extended position.

In some embodiments, the other of the followers, e.g. the first follower or the first roller, remains in contact with the channel or recess.

The steering column assembly may comprise an extended or fully extended position and wherein one of the followers, e.g. the second follower or the second roller, is in contact with the first column tube or the second column tube between a terminal end of the channel or recess and a terminal end of the first column tube or the second column tube.

The steering column assembly may comprise an extended or fully extended position wherein the second roller or second follower is in contact with an outer surface of the second column tube between the terminal end and a terminal end of the channel or recess and the first roller or first follower is in contact with the channel or recess.

The preloading mechanism may be actuated when the steering column assembly is in the extended or fully extended position The contact force between one of the followers and the channel or recess may be greater in the extended or fully extended position than in the stowed position.

The contact force between the second follower or second roller and the second column tube, e.g. the channel or recess thereof, may be greater in the extended or fully extended position than in the stowed position.

One or more of the followers may be formed of an elastomeric material.

One or more of the rollers may be formed of an elastomeric material.

The first roller and/or second roller may be formed of an elastomeric material

The steering column assembly may comprise a bearing assembly.

The bearing assembly may have a bearing race comprising a recess extending parallel with the adjustment axis and formed in an inner surface of the first column tube and a complementary recess extending parallel with the adjustment axis and formed in an outer surface of the second column tube.

The bearing assembly may comprise a plurality of ball bearings received within the race.

The preload mechanism may be arranged or configured to provide a biasing force in a direction generally perpendicular to the adjustment axis.

The preload mechanism may be arranged or configured to bias a portion of the second column tube towards a portion of the first column tube, e.g. at a predetermined position of the second column tube with respect to the first column tube.

The preload mechanism may be arranged or configured to bias a portion of the second column tube towards a portion of the first column tube, e.g. when the preload mechanism is actuated.

The preload mechanism may be arranged or configured to bias one of the first column tube and the second column tube towards a portion of the other of the first column tube and the second column tube, e.g. at a predetermined position of the second column tube with respect to the first column tube and/or when the preload mechanism is actuated.

The biasing force provided by the preload mechanism may be greater in the extended or fully extended position than in the stowed position.

The biasing force applied to the first column tube or the second column tube by the preloading mechanism may be greater in the fully extended position than the stowed position.

Another aspect of the invention provides a vehicle comprising a steering column assembly as described above.

For the avoidance of doubt, any of the features described herein apply equally to any aspect of the invention.

Another aspect of the invention provides a computer program element comprising and/or describing and/or defining a three-dimensional design for use with a simulation means or a three-dimensional additive or subtractive manufacturing means or device, e.g. a three-dimensional printer or CNC machine, the three-dimensional design comprising an embodiment of the steering column assembly described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described by way of example only with reference to the accompanying drawings in which.

DESCRIPTION

Figure 1:
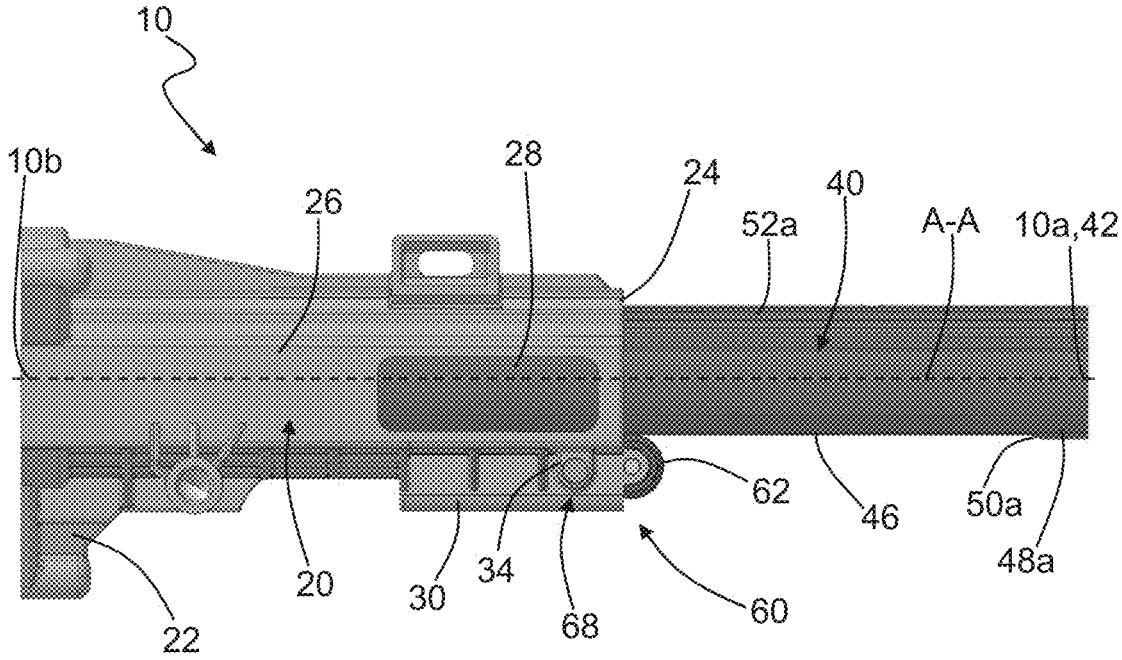
FIG. 1 is a side view of a first embodiment of steering column assembly in accordance with the present invention, shown in a partially extended position.
Figure 2:
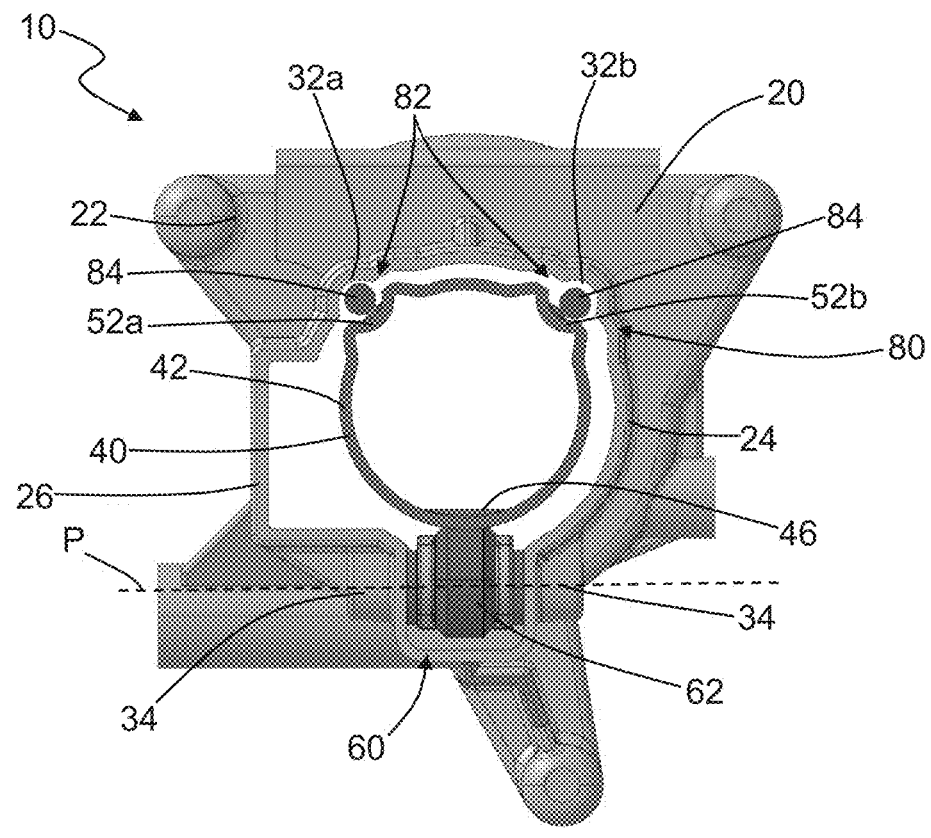
FIG. 2 is an end view of the steering column assembly of FIG. 1.

Referring now to FIGS. 1 and 2, there is shown an embodiment of steering column assembly 10 for a vehicle in accordance with the invention.

The steering column assembly 10 has a first end 10*a* for connection with a steering wheel A (FIG. 1) and a second end 10*b* spaced along an adjustment axis A-A from the first end 10*a*, and in use is mounted within a vehicle with the adjustment axis A-A extending parallel to the fore-aft direction of the vehicle.

The steering column assembly 10 comprises a first, outer column tube 20 and a second, inner column tube 40 slidably and telescopically received within the first column tube 20. The second column tube 40 is mounted so as to be displaceable with respect to the first column tube 20 along the adjustment axis A-A.

By moving the second, inner column tube 40 relative to the first, outer column tube 20, the extension of the steering column assembly 10 can be adjusted. In use, the position (or "reach") of a steering wheel (not shown) attached to the steering column assembly 10 can be adjusted in the fore and aft direction as a result of the extension adjustment. The adjustment can be effected manually or by means of an adjustment mechanism e.g. a motor (not shown), depending on the configuration of the steering column.

A preload mechanism 60 is located between the first, outer column tube 20 and the second, inner column tube 40 and, as will be described in greater detail below, is actuated at predetermined position of the second, inner column tube 40 with respect to the first, outer column tube 20 and is arranged to bias a portion of the second, outer column tube 40 towards a portion of the first, inner column tube 20. More specifically, when actuated, the preload mechanism 60 is arranged to provide a biasing force in a direction generally perpendicular to the adjustment axis A-A in order to increase the stiffness of the steering column assembly 10.

The first, outer column tube 20 has a mounting plate 22 at the second end 10*b* for mounting the steering column assembly 10 within a vehicle (not shown). The first, outer column tube 20 extends along the adjustment axis A-A from the mounting plate 22 to a free end 24 within which the second, inner column tube 40 is received. One side of the first, outer column tube 20 comprises a planar wall portion 26 extending between the mounting plate 22 and the free end 24. A generally rectangular access opening 28 extends through the planar wall portion 26 and allows access to the second, inner column tube 40, in use.

The lowermost portion of the free end 24 of the first, outer column tube 20 is formed into a recess 30 in which a preload mechanism 60 (to be described further) is mounted. As shown in the drawings, the portion of the outer column tube 20 which forms the recess 30 projects outwardly and includes a pair of bosses 34 which provide a mounting for the preload mechanism 60, as will be explained.

As is shown more clearly in FIG. 2, the upper portion of the inner surface of the first, outer column tube 20 includes a pair of identical, elongate longitudinally extending recesses 32*a*, 32*b* each extending generally parallel with the adjustment axis A-A and being positioned at the same lateral distance from, and either side of, the axis A-A. As will be described in greater detail below, the recesses 32*a*, 32*b* form part of the bearing assembly 80.

The outer surface of the second, inner column tube 40 also includes a pair of identical, elongate longitudinally extending recesses 52*a*, 52*b* each extending generally parallel with the adjustment axis A-A and being positioned at the same lateral distance from, and either side of, the axis A-A. Each recess 52*a*, 52*b* is complementary to a respective recess 32*a*, 32*b* of the first column tube 20 such that the complementary recesses together define a pair of bearing races 82. As is shown more clearly in FIGS. 3 to 5, each of the bearing races 82 contains a plurality of ball bearings 84 positioned between the first, outer column tube 20 and the second, inner column tube 40.

The bearing assembly 80 includes the bearing races 82 and ball bearings 84 and facilitates smooth movement of the first, outer column tube 20 and the second, inner column tube 40 relative to one another.

Figure 3:
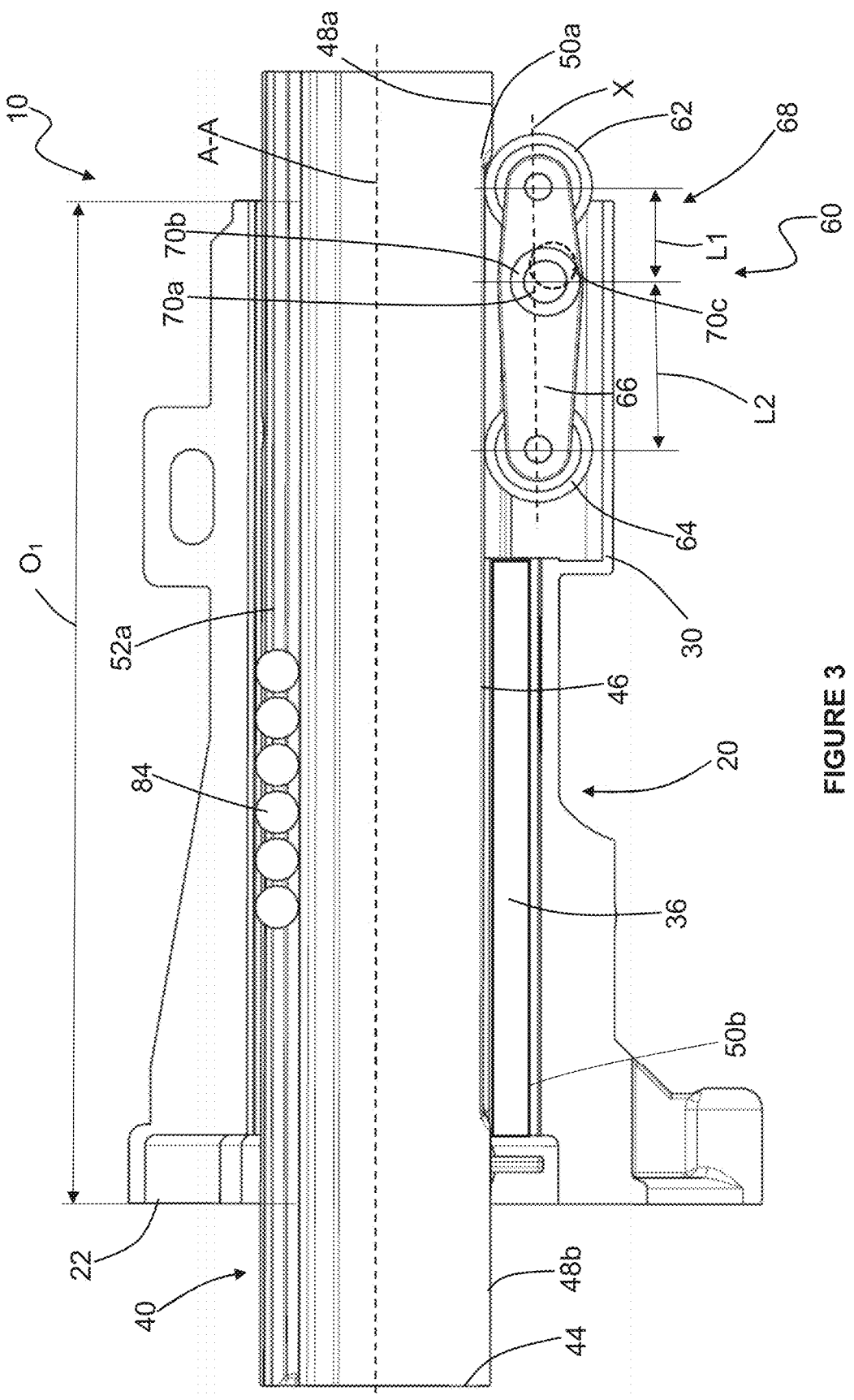
FIGS. 3, 4 and 5 are vertical cross-sectional views of the steering column assembly of FIG. 1 taken through the adjustment axis and shown in a stowed position, a partially extended position and a fully extended position respectively.

Furthermore, as shown in FIG. 3, an elongate axial slide support 36 extending parallel to the adjustment axis A-A is provided within the first, outer column tube 20 between the mounting plate 22 and the preload mechanism 60 at the lowermost portion of the first, outer column tube 20. The axial slide support 36 is arranged to support the second, inner column tube 40 from below within the first, outer column tube 20.

Figure 4:
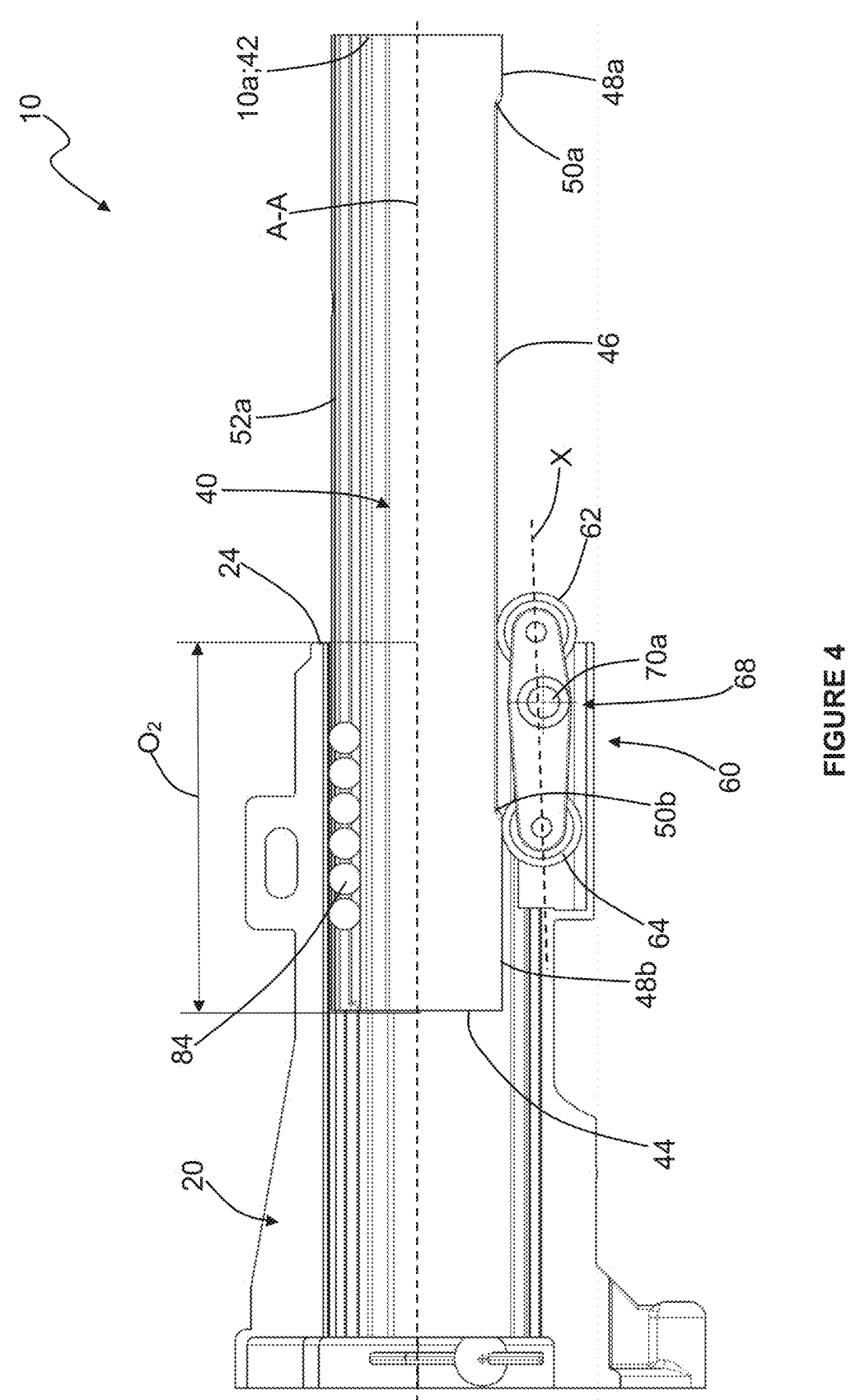
Figure 5:
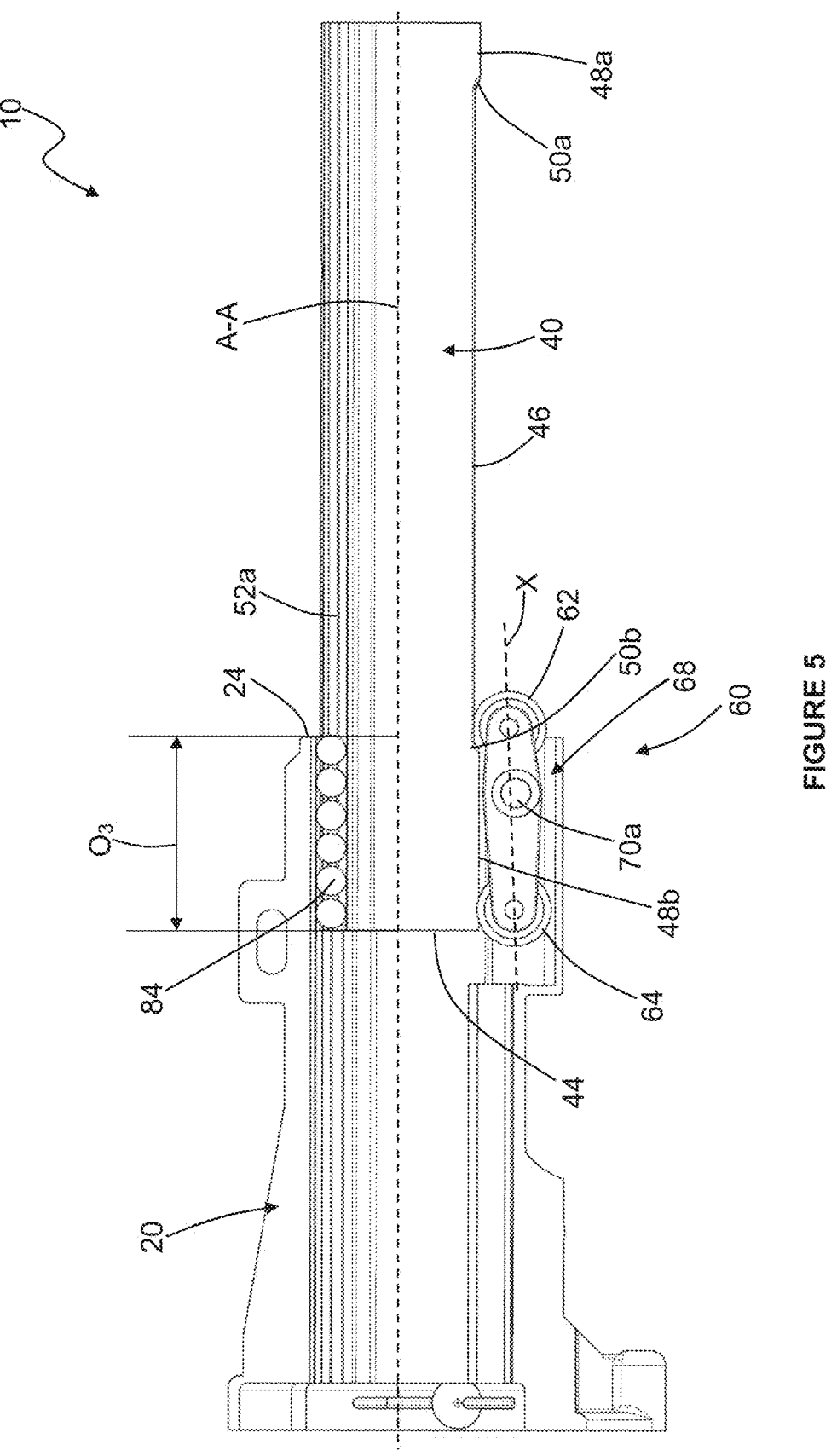

The second, inner column tube 40 extends along the adjustment axis A-A, has a first, outer end 42 and a second, inner end 44 and is moveable relative to the first, inner column tube 20 along the adjustment axis A-A. The second, inner end 44 (as shown in FIGS. 3 to 5) is received within the first, outer column tube 20 whilst the first, outer end 42 defines the first end 10*a* of the steering column assembly 10.

In use, when moving the steering column assembly 10 towards a stowed position, the second, inner column tube 40 is moved relative to the first, outer column tube 20 such that second, inner end 44 is moved towards, and beyond, the mounting plate 22. Furthermore, when moving the steering column assembly 10 towards an extended position, the second, inner column tube 40 is moved relative to the first, outer column tube 20 such that the second, inner end 44 is moved towards the free end 24.

Other than the portions of the second, inner column tube 40 in the vicinity of the bearing races 82, i.e. below the portions forming the bearing recesses 52*a*, 52*b*, the outer surface of the second, inner column tube 40 is generally part circular in cross-section, as shown in FIG. 2. However, the lowermost portion of the outer surface of the second, inner column tube 40 is shaped to form an elongate, indented recess 46 extending generally parallel to the adjustment axis A-A. The recess 46 is defined by a flattened portion of the outer surface of the second, inner column tube 40 and terminates short of each end 42, 44, as shown more clearly in FIGS. 3 to 5, leaving two end portions 48*a*, 48*b* whose lower portions are part-circular in cross-section. The transition between the ends of the recess 46 and each end portion 48*a*, 48*b* is formed by a respective ramp 50*a*, 50*b*.

Referring now to FIGS. 1 to 3, the preload mechanism 60 is mounted in the recess 30 at the free end of the first, outer column 20 and comprises a lever 66 which is pivotally mounted to the first, outer column tube 20 via a lever pivot 68 received in the mounting lugs 34 of the recess 30 and having a pivot rotational axis P (FIG. 2). Two followers in the form of a first roller 62 and a second roller 64 are mounted at opposite ends of the lever 66 on either side of the pivot 68. The first roller 62 projects partially from the first end 10*a* of the steering column assembly 10 and the second roller 64 is positioned wholly within the recess 30 of the first, outer column 20. Each of the rollers 62, 64 is identical and formed of a resiliently deformable material, e.g. an elastomeric material such as rubber or plastic. In the stowed position of FIG. 3 each of the rollers 62, 64 is received in the elongate recess 46 and the preload mechanism 60 has not been actuated.

In the present embodiment, the lever pivot 68 comprises a pivot shaft 70*a* supported in a resiliently deformable bush 70*b*, e.g. an elastomeric bush such as a rubber or plastic bush. The pivot shaft 70*a* and pivot rotational axis P extend generally perpendicular to the adjustment axis A-A.

Although the described embodiment shows a straight pivot shaft 70*a*, it will be appreciated that the shaft may comprise an eccentric pin or be mounted eccentrically to the first, outer column tube 20 as shown by the dashed line 70*c* in FIG. 3. In this case, part of the pivot shaft is offset in a radial and longitudinal direction with respect to the bosses 34 so as to tailor the mechanical advantage provided by the preload mechanism 60.

As mentioned above, the rollers 62, 64 are located on opposite sides of the lever pivot 68 along the adjustment axis A-A, and are spaced from the pivot rotational axis P by a respective moment arm or roller lever. As shown in FIG. 4, more specifically, a rotational axis of the first roller 62 is spaced from the pivot rotational axis P by a first moment arm L1 and a rotational axis of the second roller 64 is spaced from the pivot rotational axis P by a second moment arm L2. The first moment arm L1 is shorter than the second moment arm L2 in order to provide mechanical advantage to the first roller 62 when the second roller 64 is displaced.

As is also shown in FIG. 3, a roller axis X extends through the rotational axes of the rollers 62, 64. The pivot rotational axis P is offset from the roller axis X such that the rotational axis of each of the rollers 62, 64 is located radially inwardly with respect to the pivot rotational axis P.

Referring now to FIG. 3 in particular, the steering column assembly 10 is shown in a stowed position. In this position, the amount of overlap O1 between the first, outer column tube 20 and the second, inner column tube 40 is at a maximum and is substantially equal to the length of the first, outer column tube 20. As a result of the maximum amount of overlap O1, the steering column assembly 10 has the maximum amount of stiffness in this position.

Each of the rollers 62, 64 is received in the elongate recess 46 in the second, inner column 40 and the roller axis X is generally parallel with the adjustment axis A-A, as the preloading mechanism 60 has not been actuated. The first roller 62 is also in contact with the ramp 50*a* located at the end of the elongate recess 46 adjacent the first end 42 of the second, inner column tube 40 which provides a stop to prevent further retraction of the second, inner column tube

40. The second end 44 of the second, inner column tube 40 protrudes from the mounting plate 22 at the second end 10*b*.

In this position the preload mechanism 60 provides only minimal support to the second, inner column tube 40. Whilst both rollers 62, 64 are received within the elongate recess 46, they are positioned to facilitate smooth movement of the second, inner column tube 40 relative to the first, outer column tube 20 when extending the steering column assembly 10 from the stowed position. Furthermore, the biasing force applied to the elongate recess 46 by each of the rollers 62, 64 is generally equal and is minimal whilst they are received within the elongate recess 46 of the second, inner column tube 40.

Referring now to FIG. 4, the steering column assembly 10 is shown in a partially extended position. In order to move the steering column assembly 10 towards the partially extended position of FIG. 4 from the stowed position of FIG. 3, the second, inner column tube 40 is moved relative to the first, outer column tube 20 along the adjustment axis A-A such that the second, inner end 44 is moved towards the free end 24. The rollers 62, 64 facilitate smooth movement of the second, inner column tube 40 relative to the first, outer column tube 20 until the second roller 64 contacts the ramp 50*b* at the longitudinally inner end of the elongate recess 46. The ball bearings 84 also move part-way along the bearing race 82 towards the first end 10*a* of the steering column assembly 10 as the second, inner column tube 40 is displaced further out of the first, outer column tube 20.

The first roller 62 remains in contact with the elongate recess 46 whilst the second roller 64 is moved across the ramp 50*b* and contacts the end portion 48*b* of the second, inner column tube 40 positioned between the channel 46 and the second end 44.

In the position shown in FIG. 4, the amount of overlap O2 between the first, outer column tube 20 and the second, inner column tube 40 is reduced in comparison with the position of FIG. 3. In the absence of the preloading mechanism 60 the steering column assembly 10 would have much reduced stiffness when in this position.

As the second roller 64 is moved across the ramp 50*b*, the preloading mechanism 60 is actuated. More specifically, as the second roller 64 is moved over the ramp 50*b* so as to contact the end portion 48*b* it is deflected causing pivoting of the lever 66 (in an anticlockwise direction as seen in FIG. 4) and rotation of the roller axis X such that it no longer extends generally parallel with the adjustment axis A-A.

The downward displacement of the second roller 64 on engagement with the round portion 48*b* beyond the inner end of the elongate recess 46 displaces the other roller 62 in the opposite direction and results in an increase in the contact force between the first roller 62 and the recess 46. Furthermore, as the second moment arm L2 is longer than the first moment arm L1, the contact force between the first roller 62 and the recess 46 is increased further as a result of mechanical advantage. Therefore, a biasing force is applied to the second, inner column tube 40 by the preloading mechanism 60 when actuated, thereby biasing the second, inner column tube 40 towards the first, outer column tube 20 in a direction generally perpendicular to the adjustment axis A-A. Consequently, the stiffness of the steering column assembly 10 in the partially extended position is increased.

Referring now to FIG. 5, the steering column assembly 10 is shown in a fully extended position. In order to move the steering column assembly 10 towards the fully extended position of FIG. 5 from the partially extended position of FIG. 4, the second, inner column tube 40 is further moved relative to the first, outer column tube 20 along the adjustment axis A-A until the first roller 62 contacts the ramp 50*b* at the longitudinally inner end of the elongate recess 46 whilst remaining in contact with the recess 46. As the second, inner column tube 40 moves to this position, the second roller 64 remains in contact with the circular end portion 48*b* of the second, inner column tube 40 towards the second, inner end 44. The ramp 50*b* provides a stop for the outer roller 92 which prevents further outward displacement of the second, inner column tube 40. The ball bearings 84 also move part-way along the bearing race 82 towards the first end 10*a* of the steering column assembly 10 as the second, inner column tube 40 is extended, such that one of the ball bearings 84 is located proximate the free end 24 of the first, outer column tube 20 when the second, inner column tube 40 is fully extended.

In the position shown in FIG. 5, the amount of overlap O3 between the first, inner column tube 20 and the second, outer column tube 40 is at a minimum. In the absence of the preloading mechanism 60 the steering column assembly 10 would have a minimum amount stiffness when in this position.

However, in a similar manner to the position of FIG. 4, as the second roller 64 is in contact with the circular end portion 48*b* of the second, inner column tube 40 adjacent its second, inner end 44, the roller axis X is no longer generally parallel with the adjustment axis A-A. Therefore, a biasing force is applied by the preloading mechanism 60 when actuated, thereby biasing the second, inner column tube 40 towards the first, outer column tube 20 in a direction generally perpendicular to the adjustment axis A-A. Consequently, the stiffness of the steering column assembly 10 is increased.

It will be appreciated that the steering column assembly 10 may be applicable to a steer-by-wire steering system and a conventional, mechanical steering system whereby there is a direct mechanical connection between the steering wheel and steering axle.

It will be appreciated by those skilled in the art that several variations to the aforementioned embodiments are envisaged without departing from the scope of the invention.

It will also be appreciated by those skilled in the art that any number of combinations of the aforementioned features and/or those shown in the appended drawings provide clear advantages over the prior art and are therefore within the scope of the invention described herein.

The invention claimed is:

1. A steering column assembly for a vehicle having a first end for connection with a steering wheel and a second end spaced along an adjustment axis from the first end, the assembly comprising:
    a first column tube;
    a second column tube telescopically received within the first column tube displaceable with respect to the first column tube along the adjustment axis; and
    a preload mechanism located between the first column tube and the second column tube, wherein the preload mechanism is configured to be actuated at a predetermined position of the second column tube with respect to the first column tube along the adjustment axis, the preload mechanism having a portion mounted on one of the first and second column tubes that engages with a projection on the other of the first and second column tubes so as to actuate the preload mechanism, the preload mechanism including a follower having a roller mounted on one of the first and second column tubes engageable with the other of the first and second column tubes.

2. A steering column assembly according to claim 1, comprising a bearing assembly having:
    a bearing race comprising a recess extending parallel with the adjustment axis and formed in an inner surface of the first column tube and a complementary recess extending parallel with the adjustment axis and formed in an outer surface of the second column tube; and
    a plurality of ball bearings received within the race.

3. A steering column assembly according to claim 1, wherein the preload mechanism is configured to provide a biasing force in a direction generally perpendicular to the adjustment axis.

4. A vehicle comprising a steering column assembly as claimed in claim 1.

5. A steering column assembly according to claim 1, wherein the preload mechanism provides minimal support when the second column tube is in a first position along the adjustment axis relative to the first column tube and an increased support when the second column tube is in a second position along the adjustment axis relative to the first column tube.

6. A steering column assembly according to claim 1, wherein the preload mechanism applies a first biasing force in a direction generally perpendicular to the adjustment axis when the second column tube is in a first position along the adjustment axis relative to the first column tube, the preload mechanism applying a second biasing force different than the first biasing force in a direction generally perpendicular to the adjustment axis when the second column tube is in a second position along the adjustment axis relative to the first column tube.

7. A steering column assembly according to claim 1, wherein the second column tube has a first position along the adjustment axis relative to the first column tube, the second column tube having a second position along the adjustment axis relative to the first column tube, the preload mechanism being actuated as the second column tube moves relative to the first column tube along the adjustment axis from the first position to the second position.

8. A steering column assembly for a vehicle having a first end for connection with a steering wheel and a second end spaced along an adjustment axis from the first end, the assembly comprising:
    a first column tube;
    a second column tube telescopically received within the first column tube displaceable with respect to the first column tube along the adjustment axis; and
    a preload mechanism located between the first column tube and the second column tube, wherein the preload mechanism is configured to be actuated at a predetermined position of the second column tube with respect to the first column tube along the adjustment axis, the preload mechanism including a portion mounted on one of the first and second column tubes that engages with a projection on the other of the first and second column tubes so as to actuate the preload mechanism, the preload mechanism having a lever pivotally mounted on one of the first and second column tubes and having two followers on opposite sides of a lever pivot engageable with the other of the first and second column tubes and wherein the projection engages with one of the followers at a predetermined position of the second column tube with respect to the first column tube.

9. A steering column assembly according to claim 8, wherein the two followers comprise a first roller and a second roller spaced from one another along the adjustment axis.

10. A steering column assembly according to claim 9, wherein the first and second rollers are each spaced from the lever pivot in the direction of the adjustment axis.

11. A steering column assembly according to claim 9, wherein the distance between a rotational axis of the first roller and the pivot axis of the lever pivot and the distance between a rotational axis of the second roller and the pivot axis of the lever pivot are different.

12. A steering column assembly according to claim 11, wherein the first roller is located closer than the second roller to the first end and the distance between the rotational axis of the first roller and the pivot axis of the lever pivot is less than the distance between the rotational axis of the second roller and the pivot axis of the lever pivot.

13. A steering column assembly according to claim 8, wherein the lever pivot comprises a shaft rotatably mounted to the first column tube or the second column tube.

14. A steering column assembly according to claim 13, wherein the shaft is mounted eccentrically to the first column tube or the second column tube.

15. A steering column assembly according to claim 8, wherein the pivot axis of the lever pivot extends generally perpendicular to the adjustment axis.

16. A steering column assembly according to claim 8, wherein the lever is pivotally mounted on the first column tube.

17. A steering column assembly according to claim 8, wherein a surface of the first column tube or the second column tube comprises a longitudinally extending recess extending generally parallel to the adjustment axis, the longitudinally extending recess defining a channel and the followers engage the channel.

18. A steering column assembly according to claim 17, wherein the recess comprises a flattened portion of the first column tube or the second column tube.

19. A steering column assembly according to claim 18, comprising a stowed position wherein each of the followers is in contact with the channel.

20. A steering column assembly according claim 19, comprising a fully extended position and wherein one of the followers is configured to engage the projection when the steering column assembly is moved from the stowed position to the fully extended position and the other of the followers remains in contact with the channel.

21. A steering column assembly according to claim 20, wherein the contact force between the one of the followers and the channel is greater in the fully extended position than in the stowed position.

22. A steering column assembly according to claim 17, wherein the projection is located at or towards one end of the recess.

23. A steering column assembly according to claim 22, wherein the projection is elongate.

24. A steering column assembly as claimed in claim 23, wherein the projection forms part of the first or second column tube on which the lever is not mounted.

25. A steering column assembly according to claim 8, wherein one or more of the followers is formed of an elastomeric material.

26. A steering column assembly according to claim 8, wherein the preload mechanism provides minimal support when the second column tube is in a first position along the adjustment axis relative to the first column tube and an increased support when the second column tube is in a second position along the adjustment axis relative to the first column tube.

27. A steering column assembly according to claim 8, wherein the preload mechanism applies a first biasing force in a direction generally perpendicular to the adjustment axis when the second column tube is in a first position along the adjustment axis relative to the first column tube, the preload mechanism applying a second biasing force different than the first biasing force in a direction generally perpendicular to the adjustment axis when the second column tube is in a second position along the adjustment axis relative to the first column tube.

28. A steering column assembly according to claim 8, wherein the second column tube has a first position along the adjustment axis relative to the first column tube, the second column tube having a second position along the adjustment axis relative to the first column tube, the preload mechanism being actuated as the second column tube moves relative to the first column tube along the adjustment axis from the first position to the second position.

\* \* \* \* \*